H. W. NEAL.

Wheel-Plow.

No. 129,161.

Patented July 16, 1872.

129,161

UNITED STATES PATENT OFFICE.

H. W. NEAL, OF WELLSVILLE, PENNSYLVANIA, ASSIGNOR TO JASON McVAY, OF SIDNEY, OHIO.

IMPROVEMENT IN WHEEL-PLOWS.

Specification forming part of Letters Patent No. 129,161, dated July 16, 1872.

SPECIFICATION.

*To all whom it may concern:*

Be it known that I, H. W. NEAL, of Wellsville, in the county of York and State of Pennsylvania, have invented certain new and useful Improvements in Sulky-Plows; and I do hereby declare that the following is a full, clear, and exact description thereof, reference being had to the accompanying drawing, and to the letters of reference marked thereon which form a part of this specification.

The nature of my invention consists in the construction and arrangement of a "sulky-plow," as will be hereinafter more fully set forth.

In order to enable others skilled in the art to which my invention appertains to make and use the same, I will now proceed to describe its construction and operation, referring to the annexed drawing, in which—

Figure 1:
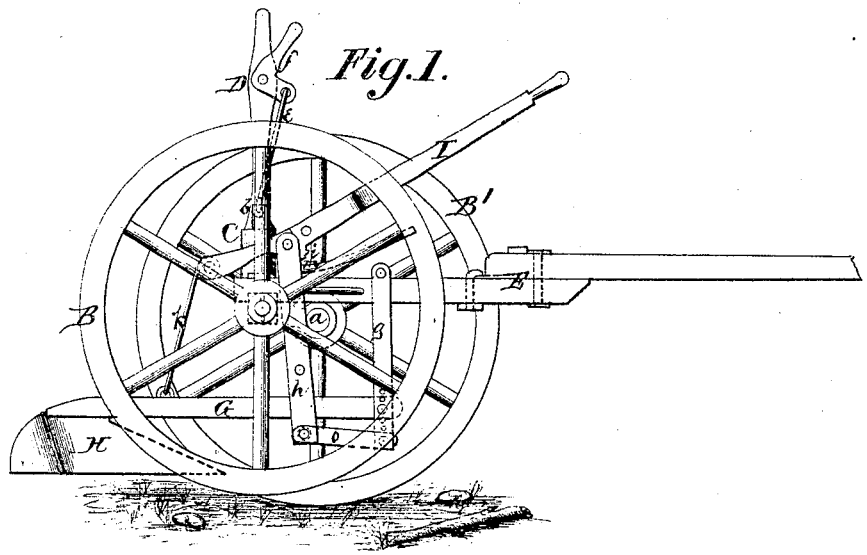
Figure 2:
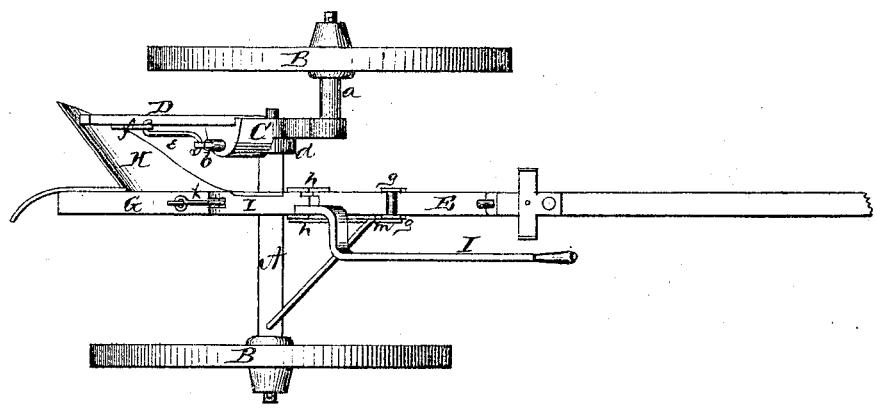
Figure 3:
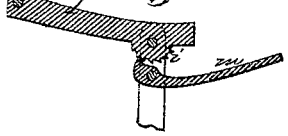

Figure 1 is a side elevation, and Fig. 2 a plan view, of my plow.

A represents the axle having a wheel, B, placed upon one end, and at the other end is pivoted an L-shaped attachment, C, having on one end an outward-projecting spindle, $a$. On this spindle is placed the other wheel B'. From the other end of the attachment projects a lever or handle, D, and this part of the attachment is enlarged on the inner side so that a bolt, $b$, may pass through the same and fall into notches made in a collar, $d$, upon this end of the main axle A. The bolt $b$ is by a rod, $e$, connected with a small lever, $f$, pivoted on the inner side the upper end of the handle D. By means of this device the wheel B' can be made to run level with, higher, or lower than the wheel B, as occasion may require. To the main axle A, midway between the two wheels B B', is firmly secured the tongue E, which may be jointed, as shown, or made in one piece, as desired. To the tongue E are secured two sets of bars, $g\,g$ and $h\,h$, connected at their lower ends, as shown. Between the front bars $g\,g$ is pivoted the front end of the plow-beam G, while the rear bars $h\,h$ act as a guide for said beam to hold it in proper position. In the bars $g\,g$ are several holes, as shown, so that the plow-beam can be raised or lowered at will. The plow H attached to the rear end of the beam G may be of any desired construction. The plow-beam G is by a rod, $k$, connected with the rear end of a lever, I, which is pivoted between the upper ends of the bars $h\,h$ above the tongue E. This lever has on its under side, at its pivot-point, a toothed projection, $i$, into which a pawl, $m$, also pivoted betweed said bars $h\,h$, may be thrown so as to lock the lever I and hold the plow-beam up when the lever has been thrown forward to raise the same. The seat may be arranged in any desired manner, so that the driver can operate the handle D with its lever $f$, the lever I, and pawl $m$ at will, or when occasion requires.

Having thus fully described my invention, what I claim as new, and desire to secure by Letters Patent, is—

The frame formed by the parts $h, g, o$, when pivoted to the rear extension of the tongue E, so as to vibrate back and forth, in combination with the beam G, lever I, and rod $k$, the several parts being arranged substantially as and for the purpose set forth.

In testimony that I claim the foregoing as my own, I affix my signature in presence of two witnesses.

H. W. NEAL.

Witnesses:
   WM. H. HUSS,
   R. J. BELT.